US011006640B2

(12) United States Patent
Hahn

(10) Patent No.: US 11,006,640 B2
(45) Date of Patent: May 18, 2021

(54) CARCASS DEHAIRING BRUSH

(71) Applicant: Lornic Design Incorporated, Holland, MI (US)

(72) Inventor: Nicholas R. Hahn, West Olive, MI (US)

(73) Assignee: Lornic Design Incorporated, Holland, MI (US)

( * ) Notice: Subject to any disclaimer, the term of this patent is extended or adjusted under 35 U.S.C. 154(b) by 0 days.

(21) Appl. No.: 16/788,240

(22) Filed: Feb. 11, 2020

(65) Prior Publication Data

US 2020/0253224 A1 Aug. 13, 2020

Related U.S. Application Data

(60) Provisional application No. 62/803,741, filed on Feb. 11, 2019.

(51) Int. Cl.
*A22B 5/08* (2006.01)
(52) U.S. Cl.
CPC ..................... *A22B 5/08* (2013.01)
(58) Field of Classification Search
CPC ........................................................ A22B 5/08
USPC .............................................. 452/87, 88, 93
See application file for complete search history.

(56) References Cited

U.S. PATENT DOCUMENTS

| 2,412,108 | A | | 12/1946 | Toti |
| 2,524,942 | A | | 10/1950 | Tomlinson |
| 2,554,671 | A | | 5/1951 | Odges |
| 2,559,001 | A | | 7/1951 | Arker |
| 2,562,681 | A | * | 7/1951 | Pine ..................... A22C 21/022 452/93 |
| 2,641,796 | A | | 6/1953 | Johnson |
| 2,694,829 | A | | 11/1954 | Johnson |
| 3,523,324 | A | | 8/1970 | Debaere |
| 3,840,938 | A | | 10/1974 | Carlson |
| 5,445,163 | A | | 8/1995 | Machacek |
| 7,070,494 | B2 | | 7/2006 | Rapp et al. |
| 7,387,565 | B1 | * | 6/2008 | Griffiths ................... A22B 5/08 452/87 |
| 7,604,532 | B2 | * | 10/2009 | Meier ..................... A22B 5/08 452/93 |
| 9,433,225 | B2 | * | 9/2016 | Servaas ................ A22C 21/022 |
| 2020/0253224 | A1 | * | 8/2020 | Hahn ...................... A22B 5/08 |

FOREIGN PATENT DOCUMENTS

NL 9002571 A 6/1992

* cited by examiner

*Primary Examiner* — Richard T Price, Jr.
(74) *Attorney, Agent, or Firm* — The Watson IP Group, PLC; Jovan N. Jovanovic

(57) ABSTRACT

A carcass dehairing brush having a rod attachment assembly and a whip assembly. The rod attachment assembly is configured to releasably be coupled to a rod, and includes a rod positioning member, a support member and a latch. The whip assembly includes a base and flexible portions extending therefrom away from the rod attachment assembly. A method of coupling is likewise disclosed.

20 Claims, 5 Drawing Sheets

CARCASS DEHAIRING BRUSH

CROSS-REFERENCE TO RELATED APPLICATION

This application claims priority from U.S. Provisional Patent Application Ser. No. 62/803,741 filed Feb. 11, 2019, entitled "Hog Dehairing Whip" the entire specification of which is hereby incorporated by reference in its entirety.

BACKGROUND OF THE DISCLOSURE

1. Field of the Disclosure

The disclosure relates in general to animal carcass, and more particularly, to a carcass dehairing brush (also commonly known as a whip).

2. Background Art

The use of carcass dehairing whips is known in the art. Typically, such brushes are rotatably mounted on rods. A plurality of rods is mounted to rotatable carrier so as to define a cylindrical configuration. One example of such processing equipment is shown in U.S. Pat. No. 3,523,324 issued to Debaere, the entire specification of which is hereby incorporated by reference in its entirety.

A number of different solutions and manners of coupling of the carcass dehairing brush. Among other solutions, one solution is shown in U.S. Pat. No. 9,433,225 issued to Servaas. In such a configuration, the coupling member is a resilient cylinder having an inner cavity that forms a receiving space. The receiving space is accessible via a narrowed entrance channel. To insert the rod, the narrowed entrance is temporarily enlarged under bias. After the rod passes, the entrance springs back to the starting position.

Problematically, forces are exerted upon the narrowed entrance channel and the receiving space to receive the rod member, which can limit the materials utilized, and can increase wear. Additionally, with the narrowed entrance channel remaining uncovered during use, depending on the forces exerted on the brush in use, the brush and the rod can become disengaged, if the forces are directed in the direction of disengagement. Further still, the centripetal forces will tend to enlarge the narrowed entrance channel as the narrowed entrance channel, which is undesirable, as it is the narrowed entrance channel that maintains the rod within the receiving space.

SUMMARY OF THE DISCLOSURE

The disclosure is directed to a carcass dehairing brush having a rod attachment assembly and a whip assembly. The rod attachment assembly is configured to releasably be coupled to a rod, and includes a rod positioning member, a support member and a latch. The whip assembly includes a base and flexible portions extending therefrom away from the rod attachment assembly. A method of coupling is likewise disclosed.

In an aspect of the disclosure, the disclosure is directed to a carcass dehairing brush comprising a whip assembly and a rod attachment assembly. The whip assembly has a base and at least one flexible whip portion extending from the base in a first direction. The flexible whip has a proximal end at the base and a distal end spaced therefrom. The rod attachment assembly has a rod positioning member, a support member and a flexible latch. The rod positioning member has an inner surface defining a slot having a first end and a second end opposite the first end. The slot has an inward opening between the first and second ends opening toward the base of the whip assembly. The support member extends between the rod positioning member and the base of the whip assembly, spaced apart from the inward opening. The flexible latch has a proximal end and a distal end. The proximal end is proximate to the base of the whip assembly and extends toward the inward opening and terminating at a distal end directed at the inward opening. The latch is structurally configured to be elastically flexed toward or away from the support member and sufficiently away from the inward opening so as to allow a rod to pass between the latch and the inward opening through the slot and into the inner surface of the rod positioning member.

In some configurations, the distal end of the latch member substantially bisects the inward opening of the rod positioning member.

In some configurations, the inner surface has a semi-circular cross-section defining a diameter, with a width of the inward opening corresponding to the diameter.

In some configurations, the distal end is spaced apart from the inner surface opposite the distal end a distance substantially corresponding to the width of the inward opening.

In some configurations, the distal end of the latch forms an outward face.

In some configurations, the outward face is substantially parallel to a plane defined by the inward opening.

In some configurations, the distal end of the latch can be flexed so as to be out of the direction of the inward opening.

In some configurations, the inward opening is substantially perpendicular to the flexible whip portion.

In some configurations, the support member is spaced apart from the latch so as to define a latch movement space therebetween.

In some configurations, the inner surface defines a semi-circular configuration with the inward opening defining a width that corresponds to the widest configuration of the semi-circular configuration.

In some configurations, the at least one flexible whip comprises a pair of flexible whips separated by a central channel therebetween.

In some such configurations, each of the pair of flexible whips includes a first side, with the first side of each of the pair of flexible whips including a plurality of raised nubs extending from the surface thereof.

In some configurations, insertion of the rod into the slot of the rod positioning member does not elastically deform the inner surface.

In some configurations, the rod attachment assembly comprises an integrally molded member.

In some configurations, the latch is substantially parallel to the at least one flexible whip portion.

In some configurations, the latch is substantially coplanar with the at least one flexible whip portion.

In an aspect of the disclosure, the disclosure is directed to a carcass dehairing whip and a rod, wherein the rod is rotatably positioned within the slot of the rod positioning assembly.

In an aspect of the disclosure, the disclosure is directed to a method of inserting a rod into a carcass dehairing whip of claim 1, comprising the steps of: providing a rod; flexing the distal end of the latch from an unflexed position toward or away from the support member sufficient to provide sufficient space for the rod to pass beyond the latch, through the inward opening and into the slot; inserting the rod beyond the latch and through the inward opening into the slot; and returning the distal end of the latch to the unflexed position.

In some configurations, the step of inserting the latch does not elastically deform the slot of the rod positioning member.

In some configurations, the step of flexing comprises the step of flexing the distal end of the latch toward the support member with the rod.

BRIEF DESCRIPTION OF THE DRAWINGS

The disclosure will now be described with reference to the drawings wherein.

DETAILED DESCRIPTION OF THE DISCLOSURE

Figure 1:
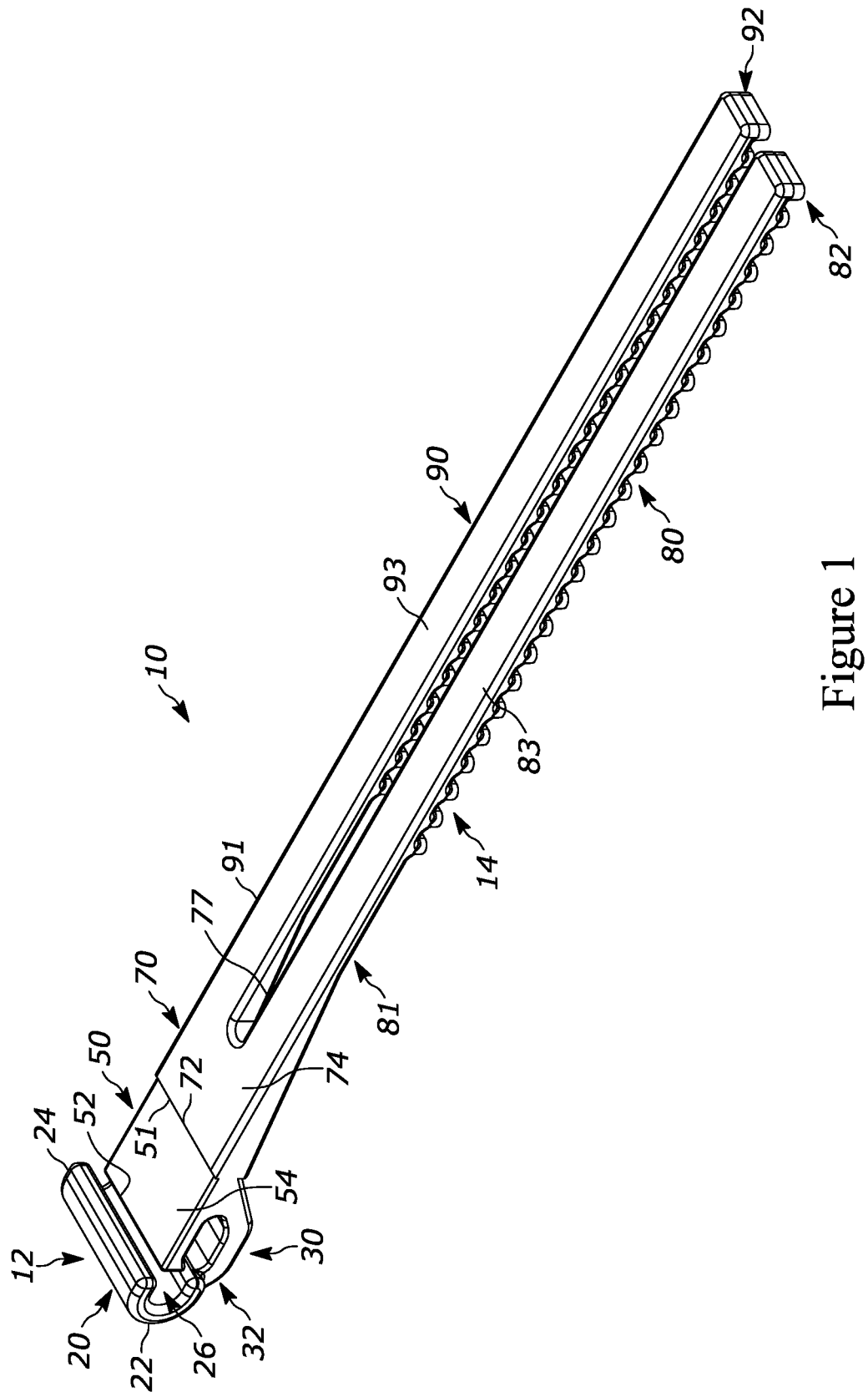
FIG. 1 of the drawings is a top perspective view of the carcass dehairing brush of the present disclosure.
Figure 2:
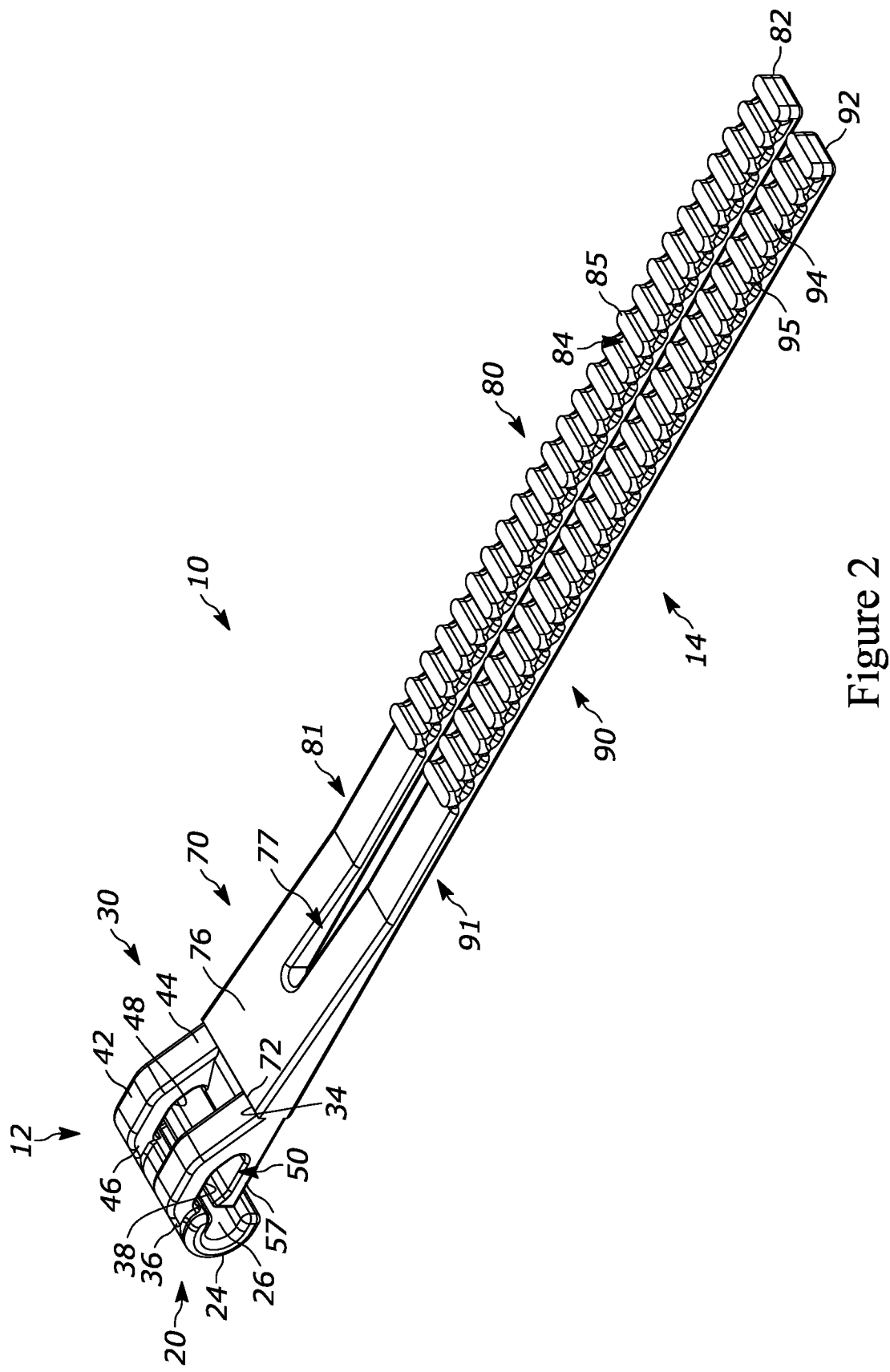
FIG. 2 of the drawings is a bottom perspective view of the carcass dehairing brush of the present disclosure.
Figure 3:
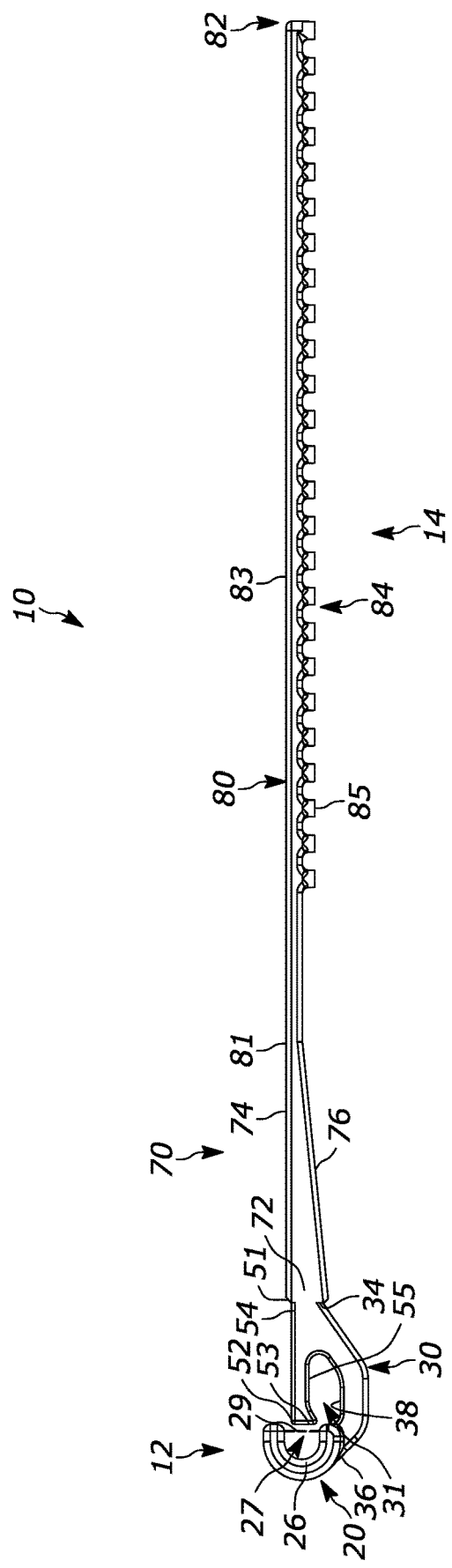
FIG. 3 of the drawings is a first side elevational view of the carcass dehairing brush of the present disclosure.
Figure 4:
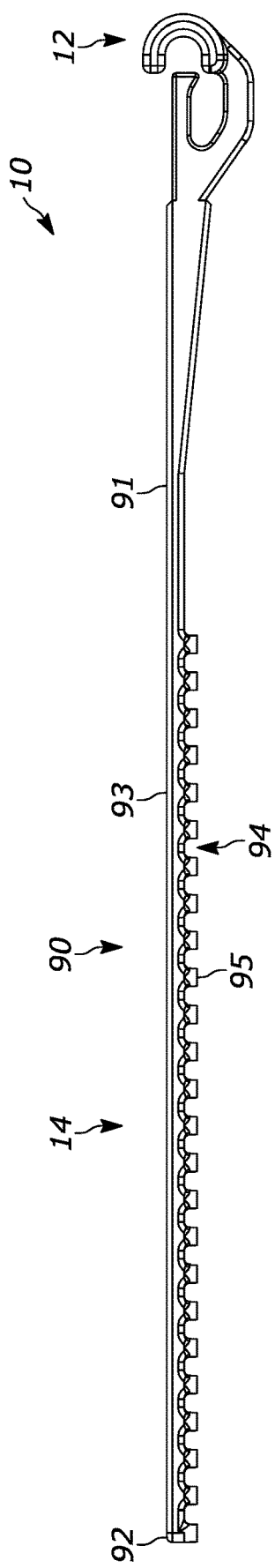
FIG. 4 of the drawings is a second side elevational view of the carcass dehairing brush of the present disclosure.
Figure 5:
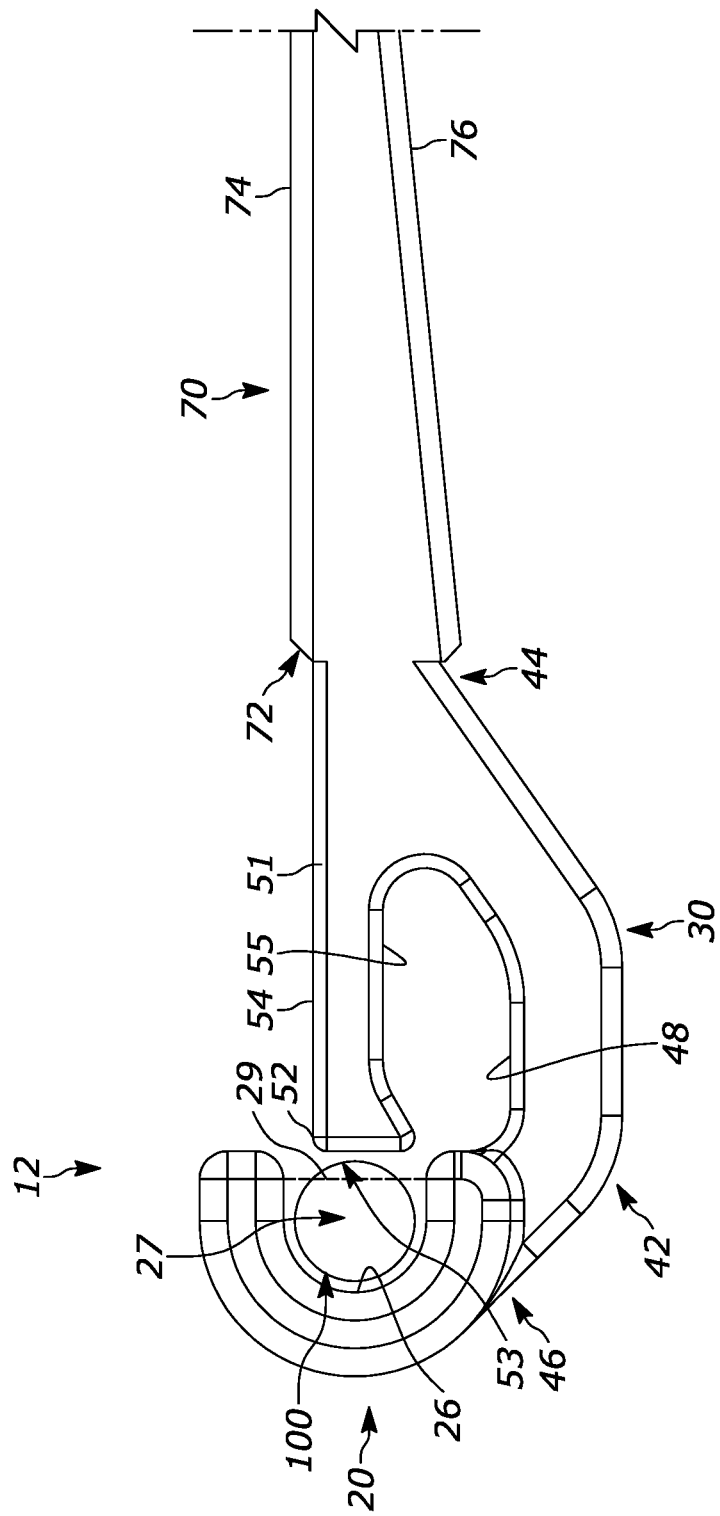
FIG. 5 of the drawings is a partial side elevational view of the carcass dehairing brush of the present disclosure, showing, additionally, a rod 100 positioned within the rod attachment assembly.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the carcass dehairing brush is shown generally at 10. As will be known to those of skill in the art, such a brush is typically mounted on a rod, such as rod 100 that spins around an offset axis of rotation in a carcass processing machine. As carcasses are passed through the machine, the carcass dehairing brush hits the carcass to clean the carcass and to remove hair and other material from the carcass. One typical application is in the processing of hogs and the like. Typically, and as can be seen in, for example, U.S. Pat. Nos. 3,523,324, 7,604,532, 9,433,225, each of which is incorporated herein by reference in their individual entirety, a plurality of brushes are positioned on a single axis and the machine has a plurality of rods generally arranged to form a cylindrical configuration. The present brush is configured to be utilized in association with similar such equipment.

The carcass dehairing brush 10 is shown as comprising rod attachment assembly 12, and whip assembly 14. In the configuration shown, the carcass dehairing brush is molded from a polymer member, such as a urethane, or the like. In some configurations, the entire structure may comprise a monolithic molded member. In other configurations, the brush may comprise a plurality of components that are coupled together through overmolding of components, comolding of components, and through the use of adhesive or fasteners. It will be understood that the brush may be formed from a number of different materials, and/or different polymers. For example, the rod attachment assembly may be formed from a first polymer with the whip assembly being formed from a second polymer. In other instances, the rod attachment assembly may be formed from multiple materials (i.e., the inner surface 26 may be formed from a polymer that has improved wear characteristics than the remainder of the rod attachment assembly). For example, in certain configurations, the polymer used may be modified so as to have different properties in different portions or regions of the brush. A number of variations as to the materials are contemplated. For example, in addition to polymers, it is contemplated that composites (such as fiber based composites) as well as metals and alloys thereof may be utilized.

The rod attachment assembly comprises rod positioning member 20, support member 30 and latch 50. The rod positioning member 20 includes first end 22, and second end 24, as well as inner surface 26. The support member is semi-circular defining an arc of approximately 160° to 190°, and more preferably an arc that is approximately 180° or less. In the configuration shown, the inner surface comprises a smooth semi-circular configuration, however, it is contemplated that the surface may be semi-circular, but may comprise, in cross-section, a polygon, such as a square, hexagon, octagon, or polygons with greater or fewer numbers of sides. Additionally, other shapes, such as elliptical shapes, for example, are contemplated, or shapes that are formed from a plurality of arcs, for example, or a combination of arcs and linear features.

In the configuration shown, the inner surface is generally uniform in cross-section between the first end and the second end. In the configuration shown, the rod positioning member has a generally uniform thickness, whereby the outer surface corresponds to the inner surface, however, variations are contemplated. In some configurations, the outer surface may be of a shape that does not correspond to the inner surface.

The inner surface 26 defines a generally uniform slot 27 between the first end and the second end of the rod positioning member, and an inward opening 29. It is contemplated that the inward opening 29 is sized so as to be at least the size of the rod with which it is intended to be utilized. Preferably, the rod does not stress the slot 27 and preferably does not outwardly bias the slot 27. Rather, the rod is capable of rotating within the slot 27 with minimal obstruction to rotation, and is spaced apart from the walls of the slot 27. The inward opening 29 is positioned so that the slot opens in the direction of the flexible whip portions The support member 30 couples the rod positioning member 20 to the whip assembly 14, and includes, in the configuration shown, a pair of arms, namely a first arm 32 and a second arm 42 that extend between the rod positioning member 20 and the whip assembly. In the configuration shown, the first arm and the second arm are generally mirror images of each other about a plane that bisects the rod positioning member and is generally perpendicular to a plane formed by the inward opening.

The first arm 32 comprises a proximal end 34 and a distal end 36. The first arm has an arcuate configuration that is outwardly convex so as to define an inner concave surface 38 and so as to define a latch movement space 31 between the latch and the inner surface 38. Similarly, the second arm 42, which is spaced apart from the first arm 32, includes proximal end 44, distal end 46 and inner surface 48. In the configuration shown, as indicated above, the arms are generally substantially identical. On the outboard side, the arms correspond to the respective first end and second end of the rod positioning member, and, are spaced apart from each other on the inboard side, so as to define a slot therebetween. Such a slot minimizes the use of material, and, also allows for some torsional forces and twisting motions of the whip assembly relative to the rod positioning channel, while maintaining stability of the rod positioning channel, and, in turn, the interface between the rod positioning channel and the rod. In other configurations, the arms may be spaced apart from the respective first end and second of the rod positioning member. In other configurations, multiple arm members are contemplated, as well as a single arm member.

The latch 50 is shown as comprising proximal end 51, distal end 52, outer surface 54 and inner surface 55. In the configuration shown, the proximal end 51 meets and diverges from the proximal ends of the first arm 32 and the second arm 42 so that the distal ends are spaced apart from each other, with the proximal ends defining a root. The distal end 52 terminates with outward surface 53. In the configuration shown, the outer surface and the inner surface are generally parallel to each other so as to define a generally uniform thickness, while the distal end 52 may be thicker, and at the root the inner surface may be filleted. Additionally, in the configuration shown, the latch 50 generally extends toward the inward opening, bisecting the same, and extending generally perpendicular to a plane defined by the inward opening 29. Additionally, in the configuration shown, the latch is substantially of a uniform cross section from first end 56 (which corresponds to first end 22) and second end 57 (which corresponds to second end 24). It is contemplated that the latch, just as the support member, may comprise a plurality of side by side latches of varying configuration, or of the same configuration, separated, for example, by slots, channels or the like.

The outward surface 53 at the distal end 52 of the latch is generally parallel to a plane formed by the inward opening 29 and is spaced apart from the inner surface 26 opposite from the outward surface a distance corresponding to the length of the inward opening 29.

The latch comprises a flexible material which allows for the latch to be bent either toward or away from the support member, that is, making the latch movement space smaller or larger. The latch can be elastically deformed, so that the latch returns to its original unstressed configuration when the force is removed. Preferably, when flexed in either direction, the distal end 52 remains spaced apart from the rod positioning channel 20.

The whip assembly 14 comprises base 70 and flexible whip portions, first whip portion 80 and second whip portion 90. The base 70 includes interfacing end 72, first side 74 and second side 76. In the configuration shown, the base 70 is thickest at interfacing end 72 and becomes thinner toward the flexible whip portion. A central channel 77 extends along the longitudinal axis and separates a portion of the base into a first portion and a second portion.

The first flexible whip portion 80 extends from the base 70 and includes proximal end 81, distal end 82, and has first side 83 and second side 84. The second side has a plurality of raised nubs 85. In the configuration shown, the raised nubs 85 define a configuration much like a step function.

The second flexible whip portion 90 extends from the base 70 and includes proximal end 91, distal end 92, and has a first side 93 and second side 94. The second side has a plurality of raised nubs 95. In the configuration shown, the raised nubs 95 define a configuration much like a step function.

In the configuration shown, the first flexible whip portion 80 and the second flexible whip portion 90 are substantially identical to each other and extend away from the rod positioning member generally perpendicular to a plane defined by the inward opening 29. The first and second flexible whip are separated from each other by being spaced apart a distance that is similar to the central channel 77, such that the central channel substantially continues between the flexible whip portions. Of course, it is contemplated that the flexible whip portions may be curved (in an unstressed configuration) or otherwise non-linear.

In the configuration shown, the first side 74 of the base 70 is coplanar with the first side 83. The second side 76 of the base 70 is inclined toward the flexible whip portions, which, with the exception of the raised nubs are substantially of uniform thickness. Of course, variations are contemplated.

To couple the rod, such as rod 100, to the carcass dehairing brush 10, the user holds the carcass dehairing brush 10 and forces the rod into contact with the outer surface 54 of the latch 50. As the rod is pressed against the outer surface 54, the latch member flexes into the latch movement space 31 and toward the support member 30. Continued movement moves the distal end 52 of the latch 30 sufficiently so as to allow the rod to be aligned with the rod positioning member 20.

Once aligned, the rod can be shifted upward beyond the distal end of the latch, beyond the inward opening 29 and into the slot 27. Once positioned within the slot 27, the latch returns to its original position and the outward face 53 interfaces with the rod 100. Essentially, the outward face 53 maintains the rod within the slot 27. As set forth above, preferably, the slot 27 is larger than the rod member, and the rod member can easily rotate within the slot. Withdrawal from the slot is precluded by the position of the latch 50 and the outward face 53 thereof.

In an alternative assembly, the latch can be flexed outwardly away from the latch movement space, and beyond the rod positioning member sufficient to allow for the passage of the rod between the distal end and the rod positioning member. Once passed into the latch movement space, the latch can be directed beyond the inward opening 29 and into the slot 27. The latch can be released to return to its unstressed position which then interfaces the outward face 53 with the rod 100.

Advantageously, while in use, the forces against the outward face 53 are directly along the latch, and, thus, wear is minimized. Furthermore, the latch does not face forces that would tend to separate the rod from the rod attachment assembly. That is, while spinning, the forces are generally into the rod positioning member due to centripetal forces. In addition, when the brush makes contact with a carcass, the forces encountered by the brush relative to the rod do not tend to flex the latch, but, rather, are directed along the length of the latch. This is an improvement over the snap fit type of couplings wherein the channel itself is enlarged to receive the rod member, and, then returning to its original configuration, in terms or wear, resistance to separation and the like.

To remove the rod from within the slot 27, the user can either flex the distal end of the latch 50 outwardly, directing the rod into the latch movement space. The rod can then be pushed against the latch wherein the latch flexes outwardly to allow the rod to pass between the distal end of the latch and the rod positioning member. The user can also push the distal end of the latch toward the latch movement space until the distal end is moved out of the way of the inward opening.

At such time the rod can be removed between the distal end of the latch and the rod positioning member.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A carcass dehairing brush comprising:
   a whip assembly having a base and at least one flexible whip portion extending from the base in a first direction, the flexible whip having a proximal end at the base and a distal end spaced therefrom; and
   a rod attachment assembly having:
      a rod positioning member having an inner surface defining a slot having a first end and a second end opposite the first end, and the slot having an inward opening between the first and second ends opening toward the base of the whip assembly;
      a support member extending between the rod positioning member and the base of the whip assembly, spaced apart from the inward opening; and
      a flexible latch having a proximal end and a distal end, the proximal end being proximate to the base of the whip assembly and extending toward the inward opening and terminating at a distal end directed at the inward opening;
   wherein the latch is structurally configured to be elastically flexed toward or away from the support member and sufficiently away from the inward opening so as to allow a rod to pass between the latch and the inward opening through the slot and into the inner surface of the rod positioning member.

2. The carcass dehairing brush of claim 1 wherein the distal end of the latch member substantially bisects the inward opening of the rod positioning member.

3. The carcass dehairing brush of claim 1 wherein the inner surface has a semi-circular cross-section defining a diameter, with a width of the inward opening corresponding to the diameter.

4. The carcass dehairing brush of claim 3 wherein the distal end is spaced apart from the inner surface opposite the distal end a distance substantially corresponding to the width of the inward opening.

5. The carcass dehairing brush of claim 1 wherein the distal end of the latch forms an outward face.

6. The carcass dehairing brush of claim 5 wherein the outward face is substantially parallel to a plane defined by the inward opening.

7. The carcass dehairing brush of claim 1 wherein the distal end of the latch can be flexed so as to be out of the direction of the inward opening.

8. The carcass dehairing brush of claim 1 wherein the inward opening is substantially perpendicular to the flexible whip portion.

9. The carcass dehairing brush of claim 1 wherein the support member is spaced apart from the latch so as to define a latch movement space therebetween.

10. The carcass dehairing brush of claim 1 wherein the inner surface defines a semi-circular configuration with the inward opening defining a width that corresponds to the widest configuration of the semi-circular configuration.

11. The carcass dehairing brush of claim 1 wherein the at least one flexible whip comprises a pair of flexible whips separated by a central channel therebetween.

12. The carcass dehairing brush of claim 11 wherein each of the pair of flexible whips includes a first side, with the first side of each of the pair of flexible whips including a plurality of raised nubs extending from the surface thereof.

13. The carcass dehairing brush of claim 1 wherein insertion of the rod into the slot of the rod positioning member does not elastically deform the inner surface.

14. The carcass dehairing brush of claim 1 wherein the rod attachment assembly comprises an integrally molded member.

15. The carcass dehairing brush of claim 1 wherein the latch is substantially parallel to the at least one flexible whip portion.

16. The carcass dehairing brush of claim 15 wherein the latch is substantially coplanar with the at least one flexible whip portion.

17. A combination carcass dehairing whip of claim 1 and a rod wherein:
   the rod is rotatably positioned within the slot of the rod positioning assembly.

18. A method of inserting a rod into a carcass dehairing whip of claim 1, comprising the steps of:
   providing a rod;
   flexing the distal end of the latch from an unflexed position toward or away from the support member sufficient to provide sufficient space for the rod to pass beyond the latch, through the inward opening and into the slot;
   inserting the rod beyond the latch and through the inward opening into the slot; and
   returning the distal end of the latch to the unflexed position.

19. The method of claim 18 wherein the step of inserting the latch does not elastically deform the slot of the rod positioning member.

20. The method of claim 18 wherein the step of flexing comprises the step of flexing the distal end of the latch toward the support member with the rod.

* * * * *